United States Patent [19]

Nunan

[11] Patent Number: 5,064,803
[45] Date of Patent: Nov. 12, 1991

[54] PREPARATION OF THREE-WAY CATALYSTS WITH HIGHLY DISPERSED CERIA

[75] Inventor: John G. Nunan, Palatine, Ill.

[73] Assignee: Allied-Signal Inc., Morris Township, Morris County, N.J.

[21] Appl. No.: 576,306

[22] Filed: Aug. 31, 1990

[51] Int. Cl.$^5$ .............................................. B01J 31/04
[52] U.S. Cl. .................................... 502/170; 502/172; 502/304
[58] Field of Search ........................ 502/170, 172, 304

[56] References Cited

U.S. PATENT DOCUMENTS

| 4,791,091 | 12/1988 | Bricker | 502/303 |
| 4,868,148 | 9/1989 | Henk et al | 502/302 |
| 4,868,149 | 9/1989 | Bricker | 502/303 |

FOREIGN PATENT DOCUMENTS 57-119838  7/1982  Japan .

OTHER PUBLICATIONS

SAE Technical paper, 881684, "A Study on Three Way Conversion Catalyst Thermal Deactivation and Improvement", M. Funabiki and T. Yamada.
Harrison et al., "Promoting Platinum Metals by Ceria", *Platinum Metals Rev.*, 1988, 32, (2), 73-83.

*Primary Examiner*—Patrick P. Garvin
*Assistant Examiner*—Brent M. Peebles
*Attorney, Agent, or Firm*—Harold N. Wells; Roger H. Criss; Gerard P. Rooney

[57] ABSTRACT

Improved three-way catalysts for use in converting the exhaust gases from internal combustion engines include ceria supported by an alumina or other metal oxide and the ceria in the freshly prepared catalysts is in the form of crystallites having a size less than 50 Å as measured by X-ray diffraction.

18 Claims, 4 Drawing Sheets

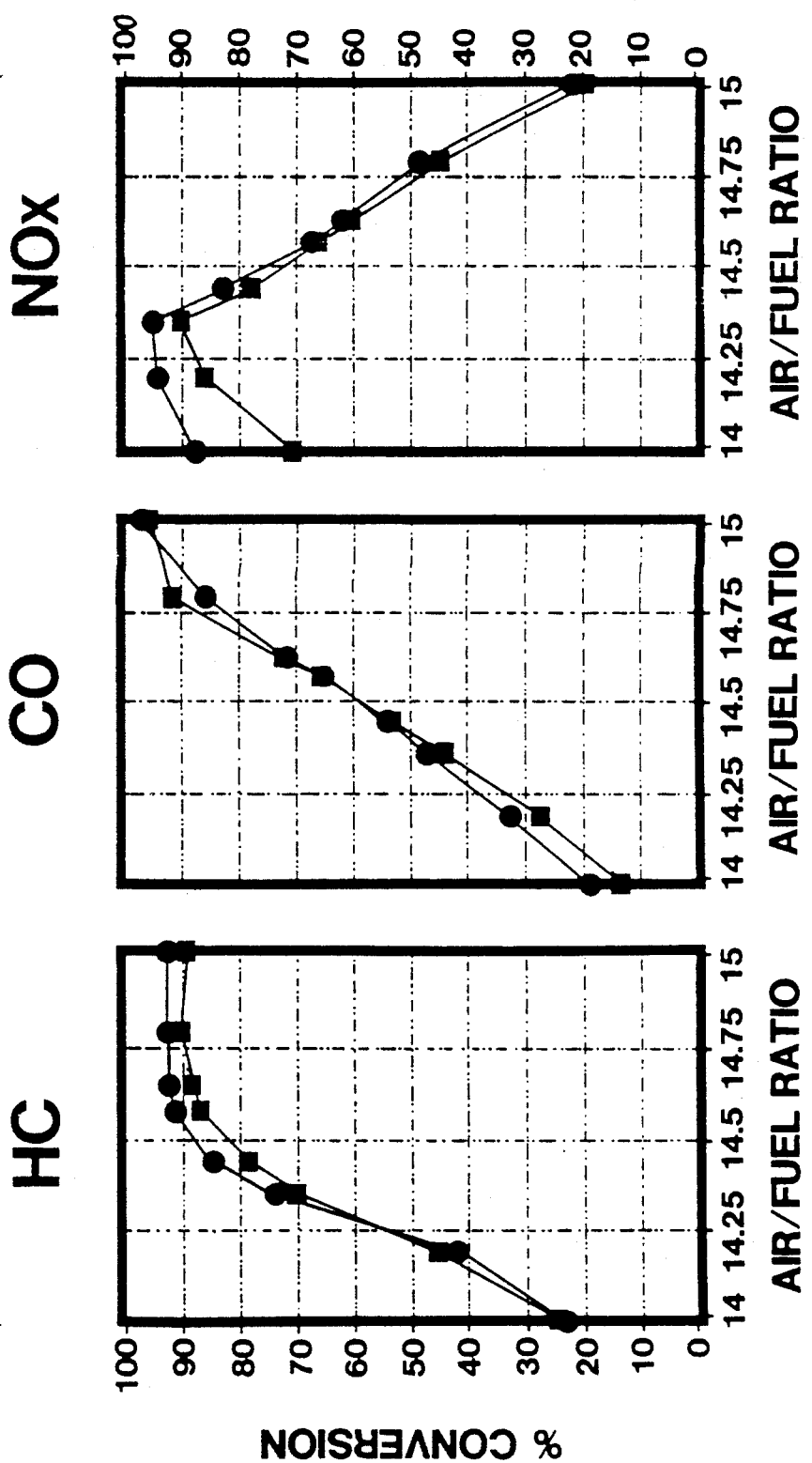

PREPARATION OF THREE-WAY CATALYSTS WITH HIGHLY DISPERSED CERIA

This invention relates to the catalysts used to convert contaminants resulting from the combustion of gasoline and other fuels in internal combustion engines. More particularly, the invention relates to catalysts used to remove carbon monoxide, hydrocarbons, and nitrogen oxides from engine exhaust gases and which are commonly referred to as three-way or TWC catalysts.

BACKGROUND OF THE INVENTION

The exhaust from internal combustion engines contains hydrocarbons, carbon monoxide, and nitrogen oxides which must be removed to levels established by government regulations. Most frequently, this is done by placing catalysts in the exhaust stream which are capable of removing all three contaminants at the same time.

Maximum conversion of all three exhaust gas contaminants can be achieved by a typical TWC catalyst only when the engine is operating in a narrow range of air/fuel ratios on either side of the stoichiometric value (typically a weight ratio of about 14.5/1). This optimum range is often referred to as the "A/F window." The engine is operated within the A/F window using an oxygen sensor as a reference to control the proper air/fuel ratio. Since the air/fuel ratio is controlled through a feedback control loop, there is a normal oscillation of the composition of the exhaust gases from rich to lean, i.e. the gases contain less or more oxygen than the target value. On the lean side, an excess of oxidants produces an oxidizing mixture and on the rich side an excess of reducing compounds is present. Exposure of the catalyst to net oxidizing or net reducing conditions can have a large effect on the performance of the catalyst, especially when ceria is present. Exposure to reducing conditions can lead to large activations of the catalyst. Net reducing conditions over extended periods are experienced by TWC catalysts during startup and during acceleration of vehicles using such catalysts.

Typical TWC catalysts contain small amounts of Group VIII metals, particularly platinum, palladium, and rhodium, supported on a high surface area support such as alumina. While gamma alumina is often preferred, other forms of alumina such as delta, eta, theta, and alpha alumina may be present. Other metal oxides such as zirconia, titania, and rare earth oxides have been suggested in the art as supports. For optimum performance the TWC catalysts will often contain promoters, such as the alkaline earth oxides including barium and strontium, transition metals including iron and nickel, and rare earth oxides including cerium and lanthanum. The function of these promoters is not fully understood but it is believed that they have several functions, among which is the stabilization of the supports to prevent or limit phase changes and loss of surface area.

Ceria is a well-known component of TWC catalysts. It is often referred to as an "oxygen storage component" since it is considered to have the ability to give up oxygen when the catalyst is exposed to reducing conditions and to reoxidize when exposed to oxidizing conditions. As has already been noted, the catalyst is operated under conditions which inherently swing between oxidizing to reducing as the oxygen sensor and its control system keep the air/fuel ratio within the desired operating A/F window around the stoichiometric value. It has also been suggested that ceria may stabilize the support structure, promote the activity of the precious metals, or promote the water gas shift reaction. See for example, B. Harrison, A. F. Diwell and C. Hallet, Platinum Metals Rev., 1988, 32, (2), 73–83.

In their report on the deactivation of three-way catalysts, Furabiki and Yamada, SAE Technical Paper Series 881684, studied the increase in platinum and ceria crystallite size as operating temperature was increased. They concluded that smaller ceria crystallites provided greater oxygen adsorption and better conversion of CO, HC, and $NO_x$. However, it appears that the smallest ceria crystallites measured were about 200 Å.

In U.S. Pat. No. 4,791,091 Bricker discloses an auto exhaust catalyst having lanthanum crystallites of less than 25 Å size which are produced by a unique process combining hydrosols of alumina with solutions of lanthanum compounds.

In their U.S. Pat. No. 4,868,149 Bricker et al. disclose another catalyst in which lanthanum is present in crystallites below 25 Å, but the lanthanum was deposited by impregnating a washcoated monolith with lanthanum nitrate. It is of interest with respect to the present invention that the crystallite size of ceria in such catalysts was reported to be 90–100 Å where ceria was deposited on the alumina washcoat by an impregnation technique.

One method of applying the Group VIII metals is to employ an impregnating solution including a hydroxy carboxylic acid in order to cause the dissolved Group VIII metal compound to penetrate into the support. One example is found in Japanese published application J57119838 assigned to Mitsui Mining & Smelting. They disclose the impregnation of a washcoated ceramic honeycomb with an aqueous solution of palladium chloride and cerium acetate including 330–150 gm/liter of a hydroxyl carboxylic acid.

It has now been found that when the ceria is disposed as small crystallites they appear to promote the reduction of the precious metal contained in the catalyst. Apparently, this results in greatly enhanced activity when the ceria is applied according to the invention, as will be seen in the description below.

SUMMARY OF THE INVENTION

Improved catalysts for conversion of the exhaust gases from internal combustion engines have ceria disposed on a support as crystallites with a size of less than 50 Å, preferably less than 35 Å, as freshly prepared and measured by X-ray diffraction. The catalyst will also contain noble metals from Group VIII and optionally promoters, such as lanthanum, barium, strontium, and iron.

In one aspect, the invention relates to a method for providing such small ceria crystallites by impregnating the support, e.g. gamma alumina with a solution of a cerium compound containing an organic compound. Preferably, such compounds contain at least two carbon atoms and comprise hydroxyl and/or carboxylic acid moieties capable of hydrogen bonding, such as polyols, sugars, and organic acids. Examples of such compounds are hydroxy carboxylic acids such as citric acid, dl-tartaric acid, and/or dl-lactic acid, polyols such as d-sorbitol and mannitol, and sugars such as glucose. The concentration of the organic compound is about 1 to 40 wt. % based on the total impregnating solution.

In another aspect, the invention relates to an automobile exhaust catalyst which contains ceria crystallites of a size less than 50 Å, as measured by X-ray diffraction.

The invention also includes the use of the organic compounds comprising hydroxyl and/or carboxylic acid moieties in the dispersion of promoters onto the catalyst support.

In still another aspect, the invention relates to a method of treating exhaust gases with noble metal containing catalysts having ceria crystallites smaller than 50 Å, as measured by X-ray diffraction.

BRIEF DESCRIPTION OF THE DRAWINGS

FIGS. 3a and 3b shows conversion of hydrocarbon, carbon monoxide, and nitrogen oxides comparing a commercial catalyst with a catalyst of the invention.

DETAILED DESCRIPTION OF THE INVENTION

Supports

Figure 1:
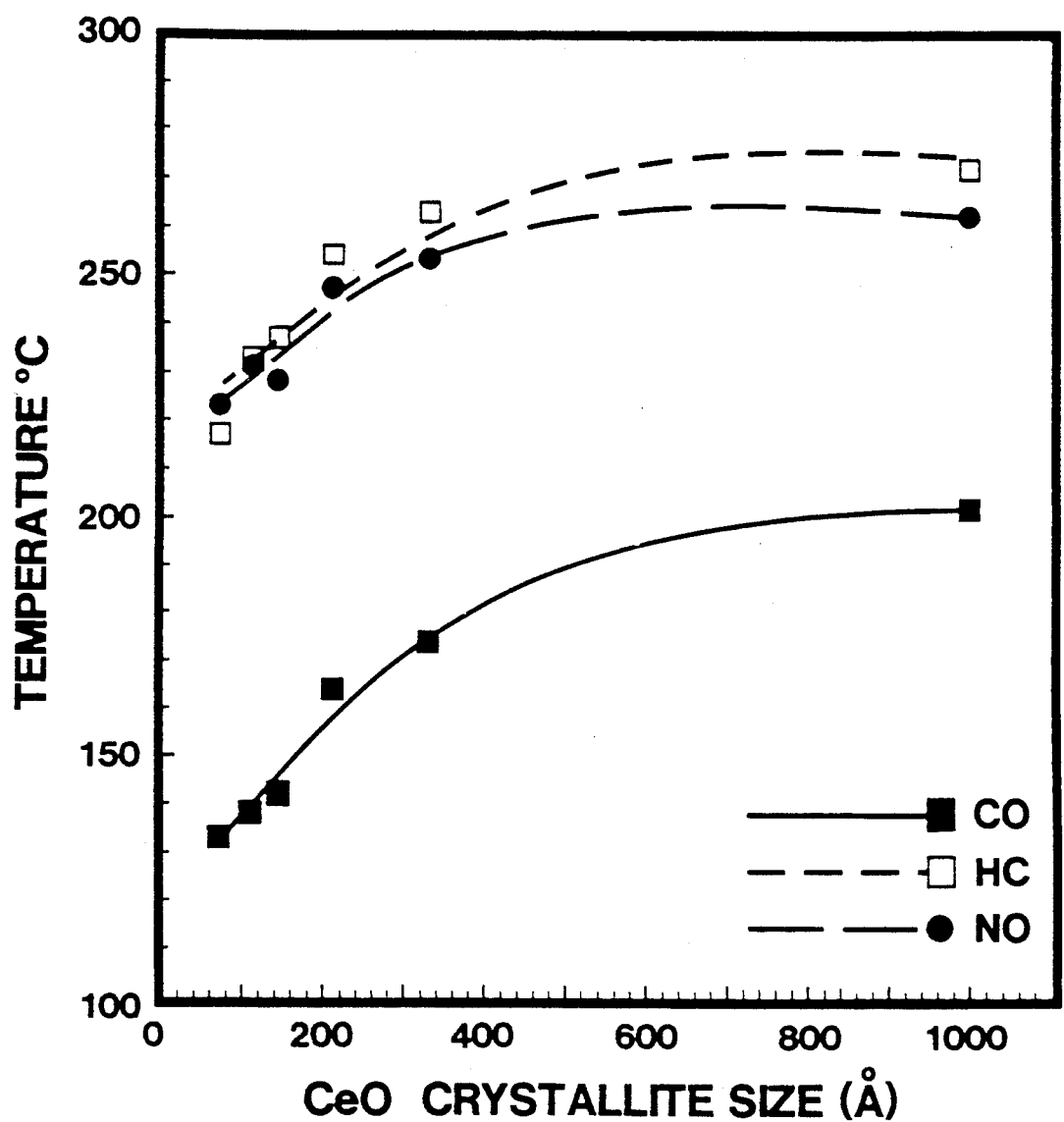
FIG. 1 shows $CeO_2$ crystallite size versus the temperature required for 25% conversion of hydrocarbons, carbon monoxide, and nitrogen oxide.

With respect to the present invention the term "support" refers to the substrate on which the noble metals and promoters are deposited. This may be in pelleted form or more preferably will be in the form of a powdered material which is deposited (i.e. as a "washcoat") on an inert structure, such as a honeycomb monolith made of ceramics or metal, as will be familiar to those skilled in the art.

The support used in the present invention may be an alumina, particularly the gamma and delta forms, which typically have a surface area of about 50 to 300 m²/gm. For use as a washcoat with monoliths the alumina will have an average particle size in the range of about 1 μm to 50 μm. Such powdered aluminas will have noble metals and promoters deposited on them, either before or after the alumina is coated on the monolith. Other supports such as zirconia could be used.

The same techniques could be applied to an inert pellet. Alternatively, a particulate support with a suitable surface area could have the catalytically active metals deposited directly on it.

Ceria

An essential element of the invention is the deposition of ceria as unusually small crystallites, that is, less than 50 Å. Heretofore, ceria has been used in many, if not most, TWC catalysts. It has been generally considered to be an "oxygen storage component" and believed to have many valuable functions. While it has been suggested as a support, most often it has been deposited on another support, typically an alumina. Generally, the ceria has been deposited as a solution of a soluble cerium compound, for example as cerium nitrate or acetate dissolved in water. Such solutions would be applied to a powdered alumina, which is then dried and calcined to convert the cerium compound to cerium oxide. Such a procedure typically provides ceria crystallites of about 80 to 150 Å. The present inventor has found that by reducing the size of the ceria crystallites and dispersing them more effectively that much improved catalyst performance is obtained and that this effect is not observed when the catalyst has been freshly prepared, but is seen only after the catalyst has been exposed to reducing conditions.

The manner of depositing ceria has been found to be important in determining the size and degree of clustering of the ceria crystallites. While the cerium compounds may be those used heretofore, that is, the nitrate, the acetate, the chloride, the sulfate, and the like, the solution will also include an organic compound. Preferably, such compounds will contain at least two carbon atoms and comprise hydroxyl and/or carboxylic acid moieties capable of hydrogen bonding, particularly polyols, sugars, and hydroxy carboxylic acids. Examples of such acids are citric, dl-tartrate, dl-lactic, malic, malonic, and succinic acids. Examples of compounds containing hydroxyl groups are polyols such as d-sorbitol and mannitol and sugars such as glucose. In such solutions the cerium compounds will comprise about 1 to 20 wt. %, the organic compound will comprise about 2 to 30 wt. %, the solvent being the remainder. As solvents, water is preferred but others such as alkanols, acetone, and tetra hydrofuran may be employed.

It is most convenient to dissolve the cerium compound in the solvent, add the compound containing the hydroxyl and/or carboxylic acid moieties and then combine the solution with powdered alumina or other support. This may be done by allowing the support to absorb as much solution as it will and then separating or evaporating the excess or by using the incipient wetness procedure familiar to those skilled in the art. In either case the damp support will be dried and then calcined at a temperature of about 500° to 700° C., either in air or in an atmosphere of oxygen in an inert gas until the cerium compound has been decomposed to the oxide and dispersed over the surface of the support. Analysis by X-ray diffraction (XRD), scanning transmission electron microscopy (STEM), and temperature programmed reduction (TPR) shows that catalyst supports prepared by the methods of the invention will have very small and well dispersed ceria crystallites. These crystallites will be less than about 50 Å, preferably less than about 35 Å, as measured by X-ray diffraction. On the finished catalyst the amount of ceria may be up to about 50 wt. %, but preferably the ceria content will be about 10 to 30 wt. %.

Noble Metals

The noble metal components will be those from Group VIII of the Periodic Table which are familiar to those skilled in the art, that is, platinum, palladium, rhodium, ruthenium, or iridium, particularly platinum, palladium, and rhodium, either alone or in combinations. Most particularly, the catalysts will be platinum-rhodium or palladium-rhodium mixtures. The amount of noble metals employed preferably will be about 0.01 to 4 wt. % based on the total weight of the catalyst, preferably about 0.05 to 0.5 wt. %.

The noble metals are applied to the alumina support by decomposing a noble metal compound which has been deposited on the support. Examples of such compounds include the following chloroplatinic acid, ammonium chloroplatinate, hydroxy disulfite platinum (II) acid, bromoplatinic acid, platinum tetrachloride hydrate, dinitrodiamino platinum, sodium tetranitroplatinate, platinum tetramine salts, rhodium trichloride, hexaamminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride, ruthenium tetrachloride, hexachlororuthenate, ruthenium nitrosylchloride and hexaammineruthenium chloride. Preferred compounds would be chloroplatinic acid, rhodium chloride, chloropalladic acid, hexachloroiridate (IV) acid, palladium nitrate and hexachlororuthenate.

The noble metals may be applied separately or in combination, but typically they will be in a common solution which is used to impregnate the support, by techniques familiar to those skilled in the art. After being deposited, the noble metal compounds will be decomposed by calcining at a temperature of about 500° to 700° C. thus leaving the metals or their oxides on the support.

Promoters

The present invention is concerned with the application of ceria as crystallites having smaller than usual size, particularly below 50 Å. In addition to ceria, catalysts of the invention may contain other promoters, non-limiting examples including compounds of rare earths such as lanthanum, samarium, and gadolinium, alkaline earths such as barium, strontium and calcium and other metals such as nickel, iron, and manganese. Such promoters may be applied according to methods familiar to those skilled in the art, preferably by solution impregnation using compounds which can be decomposed by heat to produce their oxides. Examples of such compounds include the halides, nitrates, and acetates, preferably the acetates. After calcining at a temperature of about 500° C. to about 700° C. for about 1 to 12 hours, the promoter elements will be present as their metal oxides. The promoters can also be applied as solutions which include compounds comprising hydroxyl and/or carboxylic acid moieties, such as have been found useful for depositing ceria.

In general, effective amounts of the promoters will be used, which may vary considerably. Preferably, the amount of promoter will be about 1 to 20 wt. % based on the total weight of the catalyst.

Catalyst Preparation

Catalysts of the invention may be prepared by methods known to those skilled in the art.

Typically, alumina (or other support) will be reduced to a suitable size to provide particles of about 1 μm to 50 μm and then dried at a temperature of about 100° C. to 600° C. to produce a powder suitable for washcoating a relatively non-porous substrate. The cerium compound may be deposited as previously described at this time or alternatively, after the alumina has been applied as a washcoat. The powder may be slurried in water or other suitable liquid and the substrate immersed, sprayed, or otherwise covered with the slurry. Upon drying, the substrate is then ready to receive the ceria (if not previously added), the active catalytic metals, and the desired promoters.

Alternatively, the alumina powder may be impregnated or otherwise have the active catalytic metals and promoters deposited before the slurry is made up and the substrate coated.

In either case, the noble metals and promoters may be applied to the alumina powder by methods familiar in the art. The order of application of these metals is not believed to be an essential aspect of the invention.

Effect of Ceria Crystallite Size

It has been found that the effect of ceria varies with the crystallite size. It apparently has little effect when the catalyst is freshly prepared but it is seen when the catalyst has been reduced by exposure to rich or stoichiometric exhaust gases. Analysis of catalysts by temperature programmed reduction (TPR) with hydrogen has shown that the reduction of noble metals and ceria is greatly enhanced when crystallites of ceria are below about 300 Å. The effect diminishes as the crystallite size is increased and appears to have little effect once the crystallite size reaches about 1000 Å. Since the ceria crystallite size appears to affect the performance of the catalyst in the same way, that is, the maximum improvement in activity is seen when the crystallite size is below about 100 Å and the effect is substantially gone when the crystallites are above about 300 Å, it is believed that the improvement is due to the enhanced reduction of the noble metals.

The enhanced reduction is brought about by greater contact between the noble metals and ceria for the catalysts having the more highly dispersed ceria. This is shown for example in Table A below where the fraction of Pt located on the ceria component and the alumina component of the catalyst as a function of ceria crystallite size are compared. These analyses were done using STEM. It may be concluded that the smaller the ceria crystallites, the greater the probability of finding the Pt with the ceria component of the catalyst.

Ceria crystallite sizes in the range of 150 Å–400 Å were prepared by calcining cerium nitrate and cerium acetate salts in the temperature range of 600°–800° C. The resultant ceria powder was then milled with the gamma alumina. The sample containing ceria sizes in the region of 1,000 Å was prepared using a commercial source of ceria. Ceria sizes smaller than 150 Å were prepared by impregnation of gamma alumina with the cerium salts, followed by calcination as outlined for example in Example 1 below. The catalyst preparation was then carried to completion following the same procedure outlined in Examples 9 and 10. All of the crystallite sizes are reported for fresh catalysts.

TABLE A

| Sample No. | Ce wt. % | $CeO_2$ Å | Atom % Pt on $\gamma$-$Al_2O_3$ | Atom % Pt on $CeO_2$ |
|---|---|---|---|---|
| 1 | 5 | 67 | — | 0.3 |
| 2 | 6 | 181 | 0.1 | 0.29 |
| 3 | 6 | 500 | 0.06 | 0.21 |
| 4 | 25 | ≧1000 | 0.1 | 0.06 |

FIG. 1 shows the results of tests carried out with catalysts containing 7.4 wt. % $CeO_2$, 0.77 wt. % Pt, and 0.04 wt. % Rh. The catalysts were evaluated using a synthetic exhaust gas mixture shown in Table B below. Testing involved heating the catalyst to 450° C. in the stoichiometric exhaust gas mixture (14.57 Air/Fuel). This was followed by holding at 450° C. for 0.5 hours, then dropping to 100° C. followed by a second rise to 450° C. Activation of the catalyst occurs between the first and second rises due to the reduction of the noble metals. The activity of the catalysts is shown in FIG. 1 as measured for the second rise.

It will be clear that the ceria crystallite size has a large effect on the activity of the catalyst as indicated by the temperature required for 25% conversion of the CO, HC (hydrocarbon), and $NO_x$. While there is some effect above about 400 Å, the improvement in activity below 400 Å is dramatic and the same effect is seen with each of the compounds being converted. Accordingly, it is concluded that the ceria crystallite size in the freshly prepared catalysts should be as small as possible, preferably below 50 Å, most preferably below 35 Å as measured by X-ray diffraction.

Figure 2:
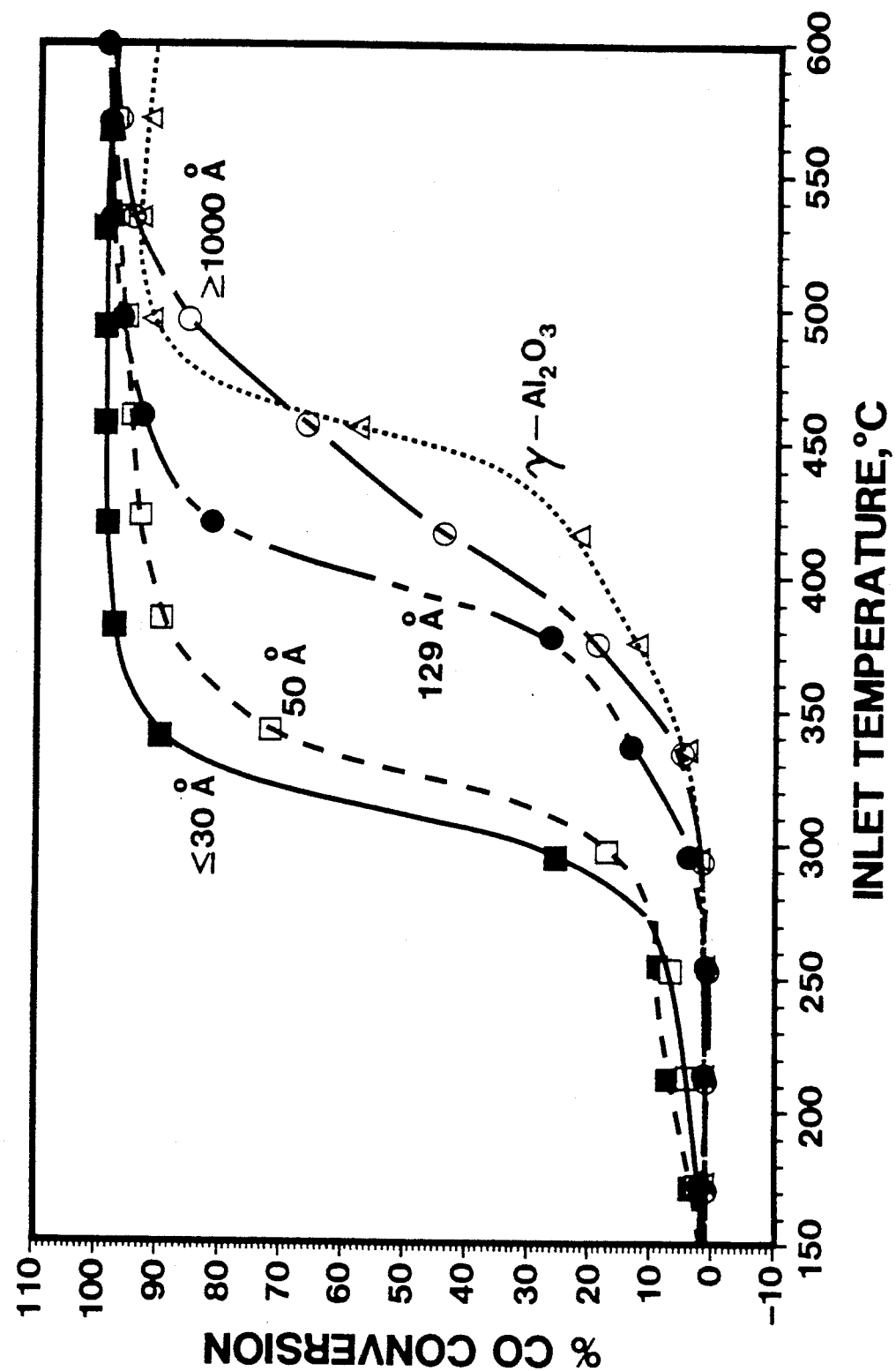
FIG. 2 shows CO conversion versus temperature for catalysts having differing ceria crystallite sizes.

FIG. 2 shows the same effect but here the entire performance of the catalyst is seen from the low temperatures typical of the startup of the catalyst through the period when the reactions of CO, HC, and $NO_x$ begin ("lightoff") and up to the highest temperatures typical of full steady state operation of the catalyst. These catalysts contained 31 wt. % ceria and were tested under more demanding conditions as 20 ppm of $SO_2$ was also present in the synthetic exhaust gas. The evaluation method was similar to that described for the earlier tests in FIG. 1 except that the temperature was raised to 600° C. and the temperature was held between the first and second rise for one hour.

The crystallite sizes in FIG. 2 are reported for the freshly prepared catalysts, however, the performance was measured after 4 hours of a simulated aging at 900° C. for 4 hours in 10% $H_2O$ and 90% air and the ceria crystallites would be expected to have grown somewhat larger. Again, the second rise activity is shown since the effect of ceria crystallite size is not seen for the first temperature rise. The same catalyst without ceria ("gamma alumina") is shown for comparison. It reaches 25% conversion of CO only at a temperature of about 420° C., while with the same catalyst containing ceria, the temperature for 25% conversion is about 395° C. when the ceria crystals are >1000 Å. The temperature drops to 380° C. when the crystals are 129 Å and to 310° C. at 50 Å and 295° C. at 30 Å or below, which is the limit of detectability presently available. Identical trends were observed for hydrocarbon and $NO_x$.

It is important to recognize that the catalysts tested and reported in FIGS. 1 and 2 had been reduced by previous exposure to reducing conditions. When the catalysts are fresh and have not been reduced, no such improvement in activity is seen. There is substantially no effect of ceria crystallite size and the sharp improvement in catalyst performance shown above in FIG. 1 is not seen. Thus, one might conclude that there is no effect of the ceria crystallite size and the advantages for such crystallites might not be recognized. Actually, if the ceria is in the form of the smallest crystal sizes and the catalysts have been operated so that reduction of the precious metals and the ceria can occur, the effect of ceria crystallite size can be seen. Although the ceria crystallites grow as the catalysts age, they remain smaller than conventionally-deposited ceria crystallites and retain a performance advantage.

EXAMPLE 1

84.5 g of $Ce(NO_3)_3.6(H_2O)$ and 58.4 g of dl-tartaric acid were dissolved in 800 g of deionized water, which gives a mole ratio of Ce/dl-Tartaric acid of 0.5/1. This mixture was transferred to a blender and 200 g of gamma alumina was added slowly. The resultant slurry was evaporated to dryness in a rotary steam evaporator. Calcination of the powder was performed by heating slowly to 600° C. in a 2%$O_2$/98%$N_2$ mixture, holding at 600° C. for 6 hours and then cooling to room temperature. Analysis of the resultant powder using XRD (X-ray diffraction) showed that the ceria crystallites were 32±3 Å in diameter in the (111) direction. Crystallite sizes were measured from the line broadening of the diffraction peak located at $2\theta \simeq 28.6°$ and from application of the Sherrer Equation. This equation relates the crystallite size to the peak width at half height.

STEM (Scanning Transmission Electron Microscope) analysis of the sample did not detect the presence of discrete ceria crystallites, indicating that they were smaller than the detection limit of the STEM. For ceria, the detection limit lies between 20–30 Å. Chemical analysis using STEM in various regions of the catalyst showed that the ceria was very evenly dispersed. The cerium atom percent in small selected areas of the catalyst agreed very closely with that found in the general view analysis and with the nominal cerium content.

EXAMPLE 2

84.5 g of $Ce(NO_3)_3.6(H_2O)$ and 58.43 g of dl-tartaric acid were dissolved in 800 g of methanol. The solution was transferred to a stainless steel blender and 200 g of gamma alumina was added slowly with vigorous stirring. The slurry was evaporated to dryness using a steam evaporator. The resultant powder was calcined in a muffle furnace in a flow of 2%$O_2$/98%$N_2$ by heating slowly to 600° C. and holding at 600° C. for 6 hours before cooling to room temperature. XRD analysis of the resultant powder showed that ceria crystallite diameters were 30±2 Å.

EXAMPLE 3

103.3 g of $Ce(NO_3)_3.6(H_2O)$ and 91.4 g of citric acid were dissolved in 300 g of methanol in a 1 liter round bottom flask. 100 g of gamma alumina was added to the mixture with stirring. The methanol was evaporated under vacuum in a water bath set at 50° C. The powder was then dried in a drying oven at 150° C. for 24 hours and finally calcined at 600° C. for 6 hours. Calcination was done as described in Examples 1 and 2. XRD analysis of the above sample showed that the ceria size was 27±2 Å. STEM analysis showed the presence of some ceria crystallites with few clusters. Most of the ceria was very highly dispersed as defined in Example 1 with crystallite sizes below 20–30 Å. Comparative chemical analysis using general fields of view and in areas with no detectable ceria crystallites showed the same levels of cerium, indicating that the cerium was very well dispersed.

EXAMPLE 4

Comparative

A reference catalyst was prepared by deleting the hydroxyl carboxylic acid from the preparation. 206.5 g of $Ce(NO_3)_3.6H_2O$ was dissolved in 800 g of deionized water. The mixture was transferred to a stainless steel blender and 200 g of gamma alumina added slowly and blended to give a slurry. The mixture was evaporated to dryness using a steam evaporator and then calcined at 600° C. for 6 hours using the procedure outlined in Example 1. After calcination the powder was milled with water and then dried to give a cake, recalcined, crushed to 20–40 Mesh. These latter steps were found not to affect the ceria crystallite size or dispersion. The resultant material was then impregnated with platinum as a chloroplatinic acid solution and rhodium as a rhodium chloride solution. After the Pt/Rh addition at a total loading of 0.81 wt. % and at Pt/Rh=19/1(weight ratio), the catalysts were calcined in air at 600° C. for 6 hours.

Analysis of this sample using XRD showed the ceria diameter to be 84±2 Å. Analysis in the STEM showed the ceria to be present as primarily 1000-5000 Å clumps which were made up of 40-60 Å crystallites. Chemical analysis in the STEM of several areas of the catalyst that did not contain ceria crystallites or clusters showed little or no evidence of cerium, showing that the cerium is very poorly dispersed in this sample.

EXAMPLE 5

1365.8 g of cerium acetate solution (6.1 wt. % Ce) was mixed with 1454 g of deionized water containing 178.5 g of dl-tartaric acid. A milky white precipitate was obtained. 111.0 g of conc. nitric acid was then added so as to dissolve the precipitate, leaving a pH of 1.09. 340 g of boehmite was then added followed by another 20.4 g of conc. nitric acid. The slurry was placed in a flat evaporating dish and oven dried at 90° C. for 36 hours. After drying the sample was heated slowly to 600° C. in 2%$O_2$/98%$N_2$ at a feed rate of 1 liter/min. XRD analysis of this sample showed that the ceria crystallites were 31±2 Å in diameter. STEM analysis showed the ceria crystallites to be 30-50 Å, but the ceria was poorly dispersed, containing clumps of ceria crystallites as large as 1 μm. Only a small fraction was dispersed ceria crystallites. It may be postulated that the cerium salt precipitated during the impregnation step and resulted in the poorer dispersion.

EXAMPLE 6

1365.8 g of cerium acetate solution (6.1 wt. % Ce) was combined with a citric acid solution containing 228.5 g of citric acid in 1500 g of deionized water. A white precipitate was obtained. 43.4 g of conc. nitric acid was then added to dissolve the precipitate. 340.6 g of boehmite was added slowly while stirring so as to give a uniform slurry. The slurry was evaporated to dryness using a steam evaporator over a 12 hour time period. The dried powder was then calcined as described in Example 5. XRD analysis of the powder showed that the cerium crystallites were 31±2 Å in diameter.

EXAMPLE 7

1639 g of cerium acetate solution (6.1 Wt. % Ce) was combined with 160.7 g of dl-lactic acid solution (80% lactic acid by weight). A clear solution was obtained to which was added 408.7 g of boehmite. The pH of the solution was then adjusted to the value prior to the boehmite addition (pH=3.43) by the addition of 9.7 g of conc. nitric acid. The resultant slurry was placed in a flat evaporating dish and dried at 90° C. for 2 days. It was then calcined as described in Example 5. XRD analysis of the powder showed that the ceria diameter was 39±2 Å.

EXAMPLE 8

Comparative

A reference catalyst was prepared without using a hydroxyl carboxylic acid as follows. 408.7 g of boehmite was blended with 1639 g of cerium acetate solution (6.1 Wt. % Ce). The slurry was added to a flat evaporation dish and placed in a drying oven at 90° C. for 48 hours. It was then calcined as described in Example 5. XRD analysis of the resultant powder showed the presence of ceria crystallites with diameters of 109±3 Å. Thus the ceria crystallite sizes are appreciably larger than measured for samples prepared without the use of organic carboxylic acids. The ceria sizes in this sample are typical for samples prepared without the use of complexing acids and where the cerium source is cerium nitrate or cerium acetate and the support is boehmite or gamma alumina. However, STEM analysis showed that the ceria crystallites ranged in size from 100 Å–500 Å and were poorly dispersed. The ceria was primarily in clumps. The fraction of the ceria in a highly dispersed state was less than found in Example 5 where a hydroxy carboxylic acid was used.

EXAMPLE 9

The base materials from Examples 1 and 3 were separately milled with water to give a slurry, then dried to give a cake, calcined and crushed to 20-40 mesh. They were then impregnated with platinum as chloroplatinic acid and rhodium as rhodium chloride. The total loadings were 0.81 Wt. % at a weight ratio of 19/1 of Pt/Rh. The ceria content was 14.7-30.7 wt. %. After a final calcination in air at 600° C. for 6 hours, the catalysts were evaluated in the laboratory using a synthetic exhaust gases shown in the following table.

TABLE B

| Air/Fuel | CO ppm | $H_2$ ppm | $C_3H_8$ ppm | $C_3H_6$ ppm | NO ppm | $O_2$ ppm | $CO_2$ ppm | $SO_2$ ppm | $H_2O$ ppm | $N_2$ |
|---|---|---|---|---|---|---|---|---|---|---|
| 14.30 | 8000 | 2667 | 267 | 167 | 1835 | 2790 | 118,800 | 20 | 100,000 | Balance |
| 14.57 | 5775 | 1925 | 193 | 167 | 1835 | 4645 | 118,800 | 20 | 100,000 | Balance |

The catalyst testing profile consisted of a temperature rise to 600° C. in a stoichiometric exhaust gas mixture (Air/Fuel 14.57/1) at a heating rate of 5° C./minute, a hold at 600° C. for 1.0 hours and than a drop to 150° C. During the hold at 600° C. for 1 hour the catalyst was exposed to the rich exhaust gas (A/F 14.3) so as to reduce the noble metals more effectively. This was followed by a second rise to 600° C. again at a heating rate of 5° C./minute. Activation of the catalyst occurs between the first and second temperature rise. The results for the second temperature rise are summarized in Table C where the temperatures for 25 and 50% conversion are given for hydrocarbon, carbon monoxide and nitrogen oxide conversion.

TABLE C

| Catalyst | $CeO_2$ Crystallite Size,/(XRD) | Temperature for 25% Conversion | | | Temperature for 50% Conversion | | |
|---|---|---|---|---|---|---|---|
| | | CO | HC | $NO_x$ | CO | HC | $NO_x$ |
| Commercial Catalyst | ~100 | 220 | 282 | 262 | 265 | 300 | 275 |
| Example 1 | 32 ± 3 | 175 | 250 | 240 | 190 | 265 | 258 |

TABLE C-continued

| Catalyst | CeO$_2$ Crystallite Size./(XRD) | Temperature for 25% Conversion | | | Temperature for 50% Conversion | | |
|---|---|---|---|---|---|---|---|
| | | CO | HC | NO$_x$ | CO | HC | NO$_x$ |
| Example 3 | 27 ± 2 | 180 | 260 | 240 | 190 | 275 | 250 |

The reference catalyst used was a comparable commercial catalyst containing 23 Wt. % Ce and the same noble metal content as the experimental catalysts, but which was prepared without using hydroxy carboxylic acid when depositing ceria. It is evident from the data in Table C that the experimental catalysts are superior in activity to the reference catalyst, even though one of them, Example 1, had half the ceria content.

EXAMPLE 10

The ceria-alumina produced in Examples 5, 6, 7, and 8 were separately milled with water to give a slurry, dried to give a solid cake and then calcined in air at 600° C. for 6 hours, crushed to 20–40 mesh, and impregnated with platinum as a chloroplatinic acid solution and rhodium as rhodium chloride. The total noble metal loading was 0.81 wt. % at a Pt/Rh weight ratio of 9/1. The ceria content was 30.7 wt. %. After a final calcination at 600° C. for 6 hours in air the catalysts were tested as described in Example 9 and the results are summarized in the following Table.

TABLE D

| Catalyst | CeO$_2$ Crystallite Size./(XRD) | Temperature for 25% Conversion | | | Temperature for 50% Conversion | | |
|---|---|---|---|---|---|---|---|
| | | CO | HC | NO$_x$ | CO | HC | NO$_x$ |
| Example 5 | 31 ± 2 | 210 | 285 | 270 | 287 | 297 | 287 |
| Example 6 | 31 ± 2 | 245 | 287 | 270 | 295 | 312 | 300 |
| Example 7 | 39 ± 2 | 290 | 312 | 295 | 310 | 323 | 315 |
| Example 8 (comp) | 109 ± 3 | 305 | 330 | 315 | 330 | 350 | 340 |

Samples prepared using the carboxylic acids in depositing ceria (Ex. 5, 6, 7) are clearly more active than the reference catalyst (Example 8) which was prepared without the use of carboxylic acids.

EXAMPLE 11

Full size monolithic pieces for engine testing were prepared as follows. 112.4 g of citric acid was dissolved in 400 g of deionized water and then added to 628.4 g of an aqueous 6.51 Wt. % Ce solution as cerium acetate. The resultant white precipitate was dissolved by the addition of 18.3 g of conc. nitric acid. Then 300 g of gamma alumina was added to the above solution and blended to give a uniform slurry and evaporated to dryness using a steam evaporator. The above procedure was repeated until 5,188 g of material was obtained. The powder was then crushed and ground to a particle size less than 250 microns. A slurry was then prepared from this powder so that a full size monolithic catalyst could be prepared. The preparation procedure used to accomplish this was designed to simulate commercial preparation procedures of commercial catalysts which are used as reference catalysts.

The slurry was prepared as follows. 352 g of Ba(NO$_3$)$_2$ was dissolved in 6390 g of deionized water to which was added 106 g of conc. sulfuric acid. This resulted in the formation of a white precipitate of BaSO$_4$. To this mixture was then added 1539 g of dilute nitric acid. The 5188 g of cerium/gamma alumina was then added slowly and blended to give a uniform slurry. The slurry was then milled using an Eiger model No. ABML-75 mill in 800 cc batches for 2 minutes at 3000 RPM. To this milled material was then added 8.6 g of 2-octanol and 7.8 g of methyl cellulose. These latter two reagents were added to help in the washcoating process.

An oval shaped cordierite monolith with a minor axis of 8 cm, a major axis of 14.3 cm, a length of 12 cm and having 400 square channels per square inch of facial area was dipped into the above described slurry. The geometric volume of the monolith was 1517 cm$^3$. After dipping the excess slurry was blown out with an air gun. The slurry coated monolith was calcined in air for about 1 hour at 540° C. Then the platinum and rhodium metals were impregnated onto the monolith as follows. The above described monolith was dipped into an aqueous solution containing platinum in the form of chloroplatinic acid and rhodium in the form of rhodium chloride. After dipping the excess solution was blown out with an air gun, dried and calcined for about an hour at 540° C. The final catalyst had a total washcoat loading of 0.178 g/cm$^3$ (2.92 g/in$^3$). The calculated composition of the catalyst was, Pt +Rh=0.706 g/L (20 g/ft$^3$) at a Pt/Rh ratio of 5/1, Ce=21.4 g/L (606 g/ft$^3$) and Ba=7.49 g/L (212 g/ft$^3$). The activity of this catalyst formulation was compared to that of a commercial catalyst where the Pt, Rh and Ba loadings were nominally the same. The only difference was in the cerium content. The reference catalyst contained 39.55 g/L (1120 g/ft$^3$) of cerium and was prepared without the use of hydroxyl carboxylic acids.

EXAMPLE 12

Full size monoliths were prepared for engine testing where the organic carboxylic acid was dl-tartaric acid and the cerium salt was cerium nitrate. 87.6 g of dl-tartaric acid was dissolved in 900 g of deionized water and then 204.5 g of 20 Wt. % cerium nitrate solution was added. 300 g of gamma alumina was then added with stirring to give a uniform slurry. The resultant slurry was evaporated to dryness and then calcined at 540° C. for about 1 hour. The above procedure was repeated until 6500 g of base material was obtained. A slurry was prepared and cordierite monoliths coated with the slurry as described in Example 11. The monoliths were then loaded with platinum and rhodium as described in Example 11. The final calculated composition of the catalyst was 0.706 g/L (20 g/ft$^3$) of Pt+Rh at a Pt/Rh ratio of 5/1. The cerium and barium contents were 27.2 g/L (770 g/ft$^3$) and 9.54 g/L (270 g/ft$^3$) respectively.

EXAMPLE 13

A catalyst sample prepared according to Examples 11 and 12 were evaluated against a state of the art reference catalyst referred to in Example 11. This was done by mounting the test catalysts and the reference catalyst in two separate converters and then placing them in the exhaust from a gasoline fueled engine. Both the reference and the test catalyst were aged in parallel by evenly dividing the exhaust from a V-8 engine into two streams and passing one through the test catalyst and the other through the reference. This aging procedure allows for very reproducible aging in the two catalysts under evaluation. The engine used for this durability cycle is a Ford 5.0L V-8 engine equipped with dual throttle body fuel injection. The durability cycle consisted of a 60 second cruise mode and a 5 second fuel cut mode. The fuel cut mode simulates a misfire condition. During the cruise mode the engine operated with a stoichiometric air/fuel ratio, while during the fuel cut mode the engine operated in a fuel-lean mode that included a distinct temperature and oxygen increase. The fuel cut mode was achieved by breaking the circuit between one of the fuel injectors and the Electronic Engine Control. The engine speed and load was adjusted so as to give an inlet exhaust gas temperature of 850° C. during the cruise mode and 800° C. during the fuel cut mode. During the fuel cut mode the catalyst bed temperature reaches a maximum value of 910° C. This cycle was repeated so as to give accumulated aging times of 25 and 100 hours, after which the catalyst performance was evaluated.

EXAMPLE 14

Figure 3B:
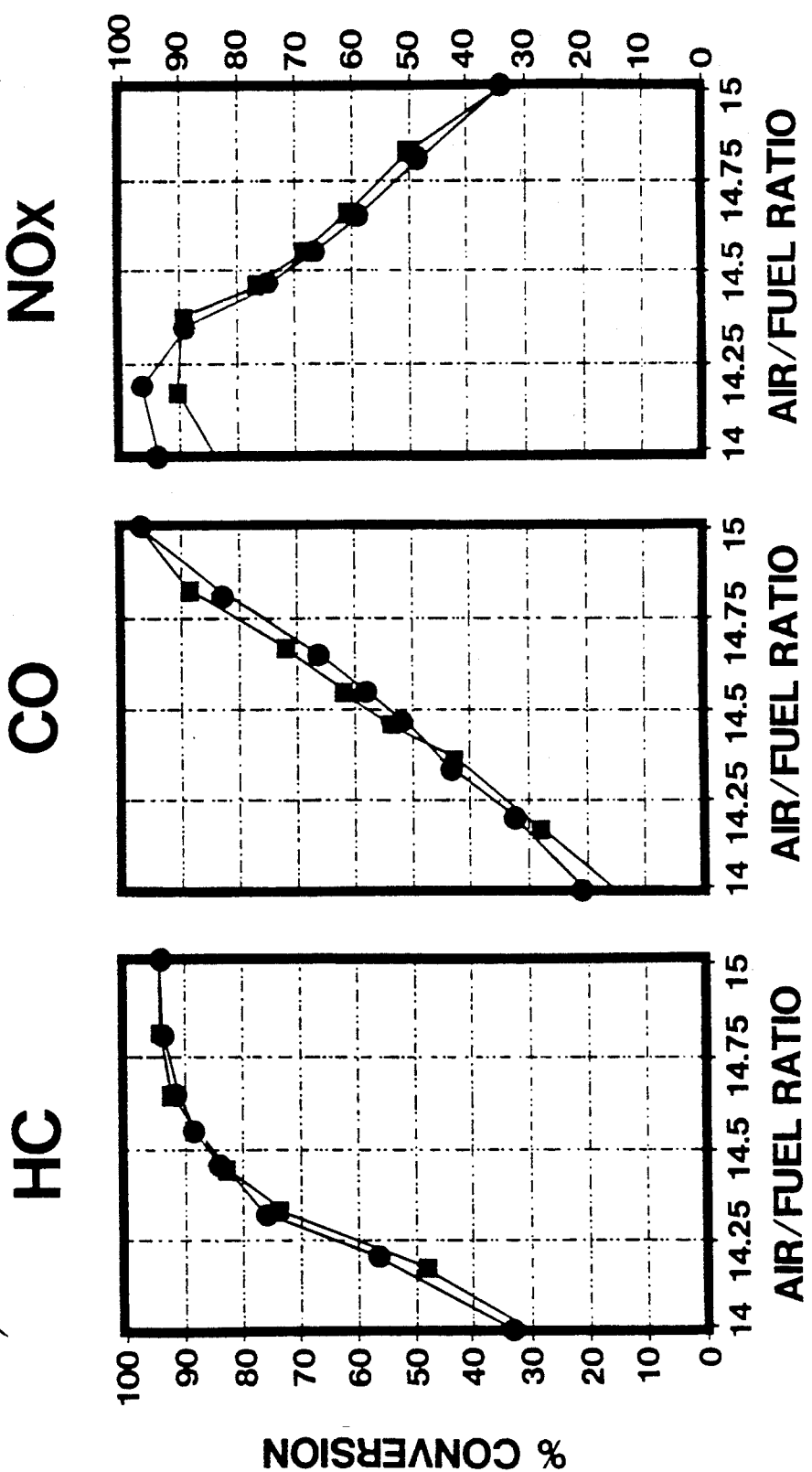

The test catalysts prepared as described in Examples 11 and 12 were evaluated using an air/fuel traverse cycle after exposure to 100 hours of the aging cycle described in Example 13. The evaluation test was performed using an engine dynamometer which measures the performance of the catalyst in converting hydrocarbon, carbon monoxide and nitrogen oxides as a function of air/fuel ratio. Again as in the aging procedure, both catalysts were evaluated together by dividing the exhaust from the engine. This allows for accurate comparison of performance for the two catalysts. The test involved evaluating the catalyst at 8 different air/fuel ratios in the range of 14.00/1 to 15.00/1 at an inlet temperature of 450° C. At each point the air/fuel ratio was oscillated plus or minus 0.4 units at a frequency of 1.0 Hz. Conversions of hydrocarbon, carbon monoxide, and nitrogen oxides were measured at each air/fuel ratio and then summarized as a plot of air/fuel ratio vs conversion as shown in FIGS. 3a and 3b for the two catalyst of the instant invention. It is clearly seen that the two catalysts of the present invention are equivalent or superior to the reference especially for NOx performance on the fuel-rich side of stoichiometric (14.55)/1. The ceria crystallite sizes measured by X-ray diffraction for the fresh and aged catalysts are shown in Table E below. The ceria sizes are smaller for the two catalysts of the invention compared to the reference catalyst, both when fresh and after aging.

TABLE E

| Example | Condition | Average CeO$_2$ Crystallite, Å | | | |
|---|---|---|---|---|---|
| | | 111 | 220 | 331 | 420 |
| 11 | Fresh | <50 | | | |
| | Aged | — | — | 150 ± 10 | 170 ± 15 |
| 12 | Fresh | <50 | | | |
| | Aged | 195 ± 5 | 170 ± 5 | 180 ± 10 | 205 ± 15 |
| Ref. | Fresh | 85 ± 5 | — | — | — |
| | Aged | 210 ± 5 | 260 ± 5 | 195 ± 5 | 235 ± 5 |

EXAMPLE 15

The test catalyst prepared as described in Example 12 was evaluated using a continuous temperature traverse cycle after 25 hours of exposure to the aging cycle described in Example 13. The evaluation test was a continuous temperature traverse test at an air fuel ratio of approximately 14.55/1. During this test the temperature of the exhaust gas going into the converter was continuously varied from 200° C. to 460° C. by varying the heat transfer rate of a stainless steel heat exchanger. Conversions of hydrocarbons, carbon monoxide and nitrogen oxides were calculated as a function of temperature. The temperature required to reach 25, 50 and 75% conversion is a common criterion used to evaluate the relative performance of different catalysts and is compared in the following Table for the commercial catalyst and the catalyst of the invention (Example 12) after 25 hours of aging.

TABLE F

| | | Temperature at % Conversion | | | |
|---|---|---|---|---|---|
| | | Commercial Catalyst | | Invention | |
| % Conversion | Component | Test 1 | Test 2 | Test 1 | Test 2 |
| 25 | HC | 376 | 376 | 377 | 375 |
| 50 | HC | 388 | 387 | 388 | 388 |
| 75 | HC | 405 | 404 | 406 | 405 |
| 25 | CO | 369 | 367 | 372 | 366 |
| 50 | CO | 380 | 381 | 381 | 379 |
| 75 | CO | 415 | 418 | 411 | 424 |
| 25 | NO$_x$ | 350 | 345 | 358 | 347 |
| 50 | NO$_x$ | 364 | 364 | 361 | 361 |
| 75 | NO$_x$ | 377 | 377 | 376 | 376 |

It is seen that the test catalyst has equivalent performance to the reference even though it contains nearly half the cerium content.

EXAMPLE 16

53.2 grams of d-sorbitol was dissolved in 200 g of deionized water. 350.2 g of a 5.84 wt. % cerium acetate solution was added. The resultant solution was added to the blender and 150 grams of gamma alumina was added slowly to give a uniform slurry. The slurry was transferred to a steam evaporator and evaporated to dryness. The resultant powder was calcined in 2% O$_2$/98% N$_2$ at 500° C. for 6 hours. XRD analyses showed that the ceria crystallites were about 25 Å. STEM analysis showed that the crystallites were 20–30 Å in size and very evenly dispersed.

I claim:

1. A method of preparing a catalyst for conversion of the exhaust from internal combustion engines comprising:
   (a) impregnating a support with a solution of a cerium compound and at least one organic compound containing hydroxyl and/or carboxylic acid moieties selected from the group consisting of polyols, sugars, and hydroxy carboxylic acids;
   (b) drying and calcining the impregnated support of (a) to produce supported ceria crystallites having a size below about 50 Angstroms as measured by X-ray diffraction;
   (c) impregnating the calcined product of (b) with one or more solutions of compounds from Group VIII, and optionally catalyst promoters;
   (d) drying and calcining the impregnated product of (c) and recovering the product as said conversion catalyst.

2. The method of claim 1 wherein said organic compound of (a) has at least two carbon atoms and comprises hydroxyl and/or carboxylic acid moieties capable of hydrogen bonding.

3. The method of claim 2 wherein said organic compound is a hydroxyl carboxylic acid.

4. The method of claim 3 wherein said hydroxy carboxylic acid is at least one member of the group consisting of citric acid, dl-tartaric acid, dl-lactic acid, and malic acid.

5. The method of claim 4 wherein said hydroxy carboxylic acid is citric acid.

6. The method of claim 4 wherein said hydroxy carboxylic acid is dl-tartaric acid.

7. The method of claim 4 wherein said hydroxy carboxylic acid is dl-lactic acid.

8. The method of claim 2 wherein said organic compound is a polyol.

9. The method of claim 8 wherein said polyol is d-sorbitol.

10. The method of claim 8 wherein said polyol is mannitol.

11. The method of claim 2 wherein said organic compound is a sugar.

12. The method of claim 11 wherein said sugar is glucose.

13. The method of claim 1 wherein said ceria crystallites have a size below about 35 Å.

14. The method of claim 1 wherein said cerium compound is about 1 to 20 wt-percent of the impregnating solution of (a).

15. The method of claim 1 wherein the impregnating solution of (c) comprises promoters selected from the group consisting of rare earth and alkaline earth metals.

16. The method of claim 15 wherein said impregnating solution of (c) includes at least one organic compound containing hydroxyl and/or carboxylic acid moieties.

17. The method of claim 1 wherein the support is alumina.

18. A catalyst for the conversion of the exhaust from internal combustion engines prepared by the method of claim 1.

* * * * *